US010959095B2

(12) United States Patent
Mishra

(10) Patent No.: US 10,959,095 B2
(45) Date of Patent: Mar. 23, 2021

(54) METHOD, SYSTEM AND APPARATUS FOR POLICY BASED AUTHORIZATION AND AUTHENTICATION OF DATA TRAFFIC BYPASSING MOBILE NETWORK

(71) Applicant: REDKNEE INC., Mississauga (CA)

(72) Inventor: Abhishek Mishra, Bangalore (IN)

(73) Assignee: OPTIVA CANADA INC.

( * ) Notice: Subject to any disclaimer, the term of this patent is extended or adjusted under 35 U.S.C. 154(b) by 292 days.

(21) Appl. No.: 15/768,727

(22) PCT Filed: Oct. 14, 2015

(86) PCT No.: PCT/IB2015/057887
§ 371 (c)(1),
(2) Date: Apr. 16, 2018

(87) PCT Pub. No.: WO2017/064536
PCT Pub. Date: Apr. 20, 2017

(65) Prior Publication Data
US 2018/0309755 A1    Oct. 25, 2018

(51) Int. Cl.
*H04W 12/06* (2009.01)
*H04W 76/10* (2018.01)
(Continued)

(52) U.S. Cl.
CPC ............. *H04W 12/06* (2013.01); *H04L 63/08* (2013.01); *H04L 63/0876* (2013.01);
(Continued)

(58) Field of Classification Search
CPC ..... H04L 63/0876; H04L 63/08; H04L 63/10; H04W 76/11; H04W 76/10; H04W 8/20;
(Continued)

(56) References Cited

U.S. PATENT DOCUMENTS

| 7,760,711 B1 * | 7/2010 | Kung ................... H04L 12/145 370/352 |
| 8,675,488 B1 * | 3/2014 | Sidebottom ........... H04L 67/141 370/235 |

(Continued)

FOREIGN PATENT DOCUMENTS

| CA | 2889393 A1 | 5/2014 |
| WO | WO-2011046348 A2 | 4/2011 |

OTHER PUBLICATIONS

Thiébaut et al., Using a Trusted WLAN Network to Offload Mobile Traffic and Leverage Deployed Broadband Network Gateways, Jun. 2012, Bell Labs Technical Journal, vol. 17, No. 1, pp. 89-104 (Year: 2012).*

(Continued)

*Primary Examiner* — Kenneth W Chang
(74) *Attorney, Agent, or Firm* — Perry + Currier

(57) ABSTRACT

A policy server and a charging server authorize and authenticate data traffic bypassing a mobile network. The policy server stores subscriber records, each containing one a mobile subscriber identifier corresponding to a communication device. The policy server receives a control session request from a gateway server in a fixed broadband network, including a broadband subscriber identifier and a first network address. Responsive to receiving the request, the policy server creates and stores a control session record including the broadband subscriber identifier and the first network address. The policy server receives an access session request from an application server in a multimedia network, including a mobile subscriber identifier and a second network address. The policy server determines whether the first network address matches the second network address; and when the determination is affirmative,
(Continued)

updates the control session record to insert the mobile subscriber identifier.

18 Claims, 4 Drawing Sheets

(51) Int. Cl.
*H04W 8/26* (2009.01)
*H04W 12/08* (2021.01)
*H04L 29/06* (2006.01)
*H04W 76/11* (2018.01)
*H04W 8/20* (2009.01)
*H04W 8/18* (2009.01)

(52) U.S. Cl.
CPC .............. *H04L 63/10* (2013.01); *H04W 8/20* (2013.01); *H04W 8/26* (2013.01); *H04W 12/08* (2013.01); *H04W 76/10* (2018.02); *H04W 76/11* (2018.02); *H04W 8/18* (2013.01)

(58) Field of Classification Search
CPC ....... H04W 8/26; H04W 12/06; H04W 12/08; H04W 8/18
See application file for complete search history.

(56) References Cited

U.S. PATENT DOCUMENTS

| | | | | |
|---|---|---|---|---|
| 9,668,161 | B2* | 5/2017 | Kavunder | H04W 28/0215 |
| 2007/0022469 | A1* | 1/2007 | Cooper | H04L 63/107 |
| | | | | 726/3 |
| 2009/0109845 | A1* | 4/2009 | Andreasen | H04L 12/1407 |
| | | | | 370/230 |
| 2012/0044908 | A1* | 2/2012 | Spinelli | H04M 15/66 |
| | | | | 370/331 |
| 2013/0288644 | A1* | 10/2013 | Schroeder | H04W 12/06 |
| | | | | 455/411 |
| 2015/0373688 | A1* | 12/2015 | Samuel Raj | H04L 63/108 |
| | | | | 370/329 |

OTHER PUBLICATIONS

Siddiqui, Imran. International Search Report for Pct International Application No. PCT/IB2015/057887 dated Jul. 6, 2016.
Siddiqui, Imran. Written Opinion for PCT International Application No. PCT/IB2015/057887 dated Jul. 6, 2016.
WIPO/IB, International Preliminary Report on Patentability, dated Apr. 17, 2018, re PCT International Patent Application No. PCT/IB2015/057887.

* cited by examiner

METHOD, SYSTEM AND APPARATUS FOR POLICY BASED AUTHORIZATION AND AUTHENTICATION OF DATA TRAFFIC BYPASSING MOBILE NETWORK

FIELD

The specification relates generally to processing mobile data traffic, and specifically to a method, system and apparatus for authorization and authentication of mobile data traffic bypassing the mobile network.

BACKGROUND

Non-seamless WLAN offload (NSWO) is a known set of technologies permitting mobile computing devices such as smart phones to direct certain data traffic over wide area networks, bypassing mobile networks that would otherwise be used for such traffic. However, the bypass traffic may still terminate at a network element associated with the mobile network, and thus it may remain desirable for elements of the mobile network to track the traffic for authorization and authentication purposes.

In some instances, interworking between wide area networks and mobile networks is possible, for example according to the principles set out in the Broadband Forum specifications. In other instances, however, such interworking may be difficult or impossible, such as when the broadband and mobile networks use distinct identifiers for communication devices.

SUMMARY

According to an aspect of the specification, a method is provided in a policy server of a mobile network for authorization and authentication of data traffic bypassing the mobile network, the method comprising: storing a plurality of subscriber records in a memory, each subscriber record containing one of a plurality of mobile subscriber identifiers corresponding to one of a plurality of communication devices; receiving, at a processor of the policy server, a control session request from a gateway server in a fixed broadband network, the control session request including a broadband subscriber identifier and a first network address; responsive to receiving the request, creating and storing a control session record including the broadband subscriber identifier and the first network address; receiving an access session request from an application server in a multimedia network, the access session request including one of the mobile subscriber identifiers and a second network address; determining whether the first network address matches the second network address; and when the determination is affirmative, updating the control session record to insert the mobile subscriber identifier.

According to another aspect of the specification, a policy server is provided in a mobile network, comprising: a memory storing a plurality of subscriber records, each subscriber record containing one of a plurality of mobile subscriber identifiers corresponding to one of a plurality of communication devices; a network interface; and a processor interconnected with the memory and the network interface, and configured to perform the above method.

According to a further aspect of the specification, a method is provided in a charging server of a mobile network for authorization and authentication of data traffic bypassing the mobile network, the method comprising: storing a plurality of charging records in a memory, each charging record containing one of a plurality of mobile subscriber identifiers corresponding to one of a plurality of mobile computing devices; receiving, at a processor of the charging server, a charging session request from an authentication, authorization and accounting (AAA) server in a fixed broadband network, the charging session request including a broadband subscriber identifier and a first network address; responsive to receiving the request, creating and storing a charging session record including the broadband subscriber identifier and the first network address; receiving a policy session request from a policy server in the mobile network, the policy session request including the broadband subscriber identifier; responsive to receiving the policy session request, creating and storing a policy session record containing the broadband subscriber identifier; receiving a policy session update message from a policy server in the mobile network, the policy session update message including one of the mobile subscriber identifiers and a second network address; responsive to receiving the policy session update message: updating the policy session record to insert the mobile subscriber identifier; and updating the charging session record to insert the mobile subscriber identifier.

According to yet another aspect of the specification, a charging server is provided in a mobile network, comprising: a memory storing a plurality of charging records, each charging record containing one of a plurality of mobile subscriber identifiers corresponding to one of a plurality of mobile computing devices; a network interface; and a processor interconnected with the memory and the network interface, and configured to perform the above method.

BRIEF DESCRIPTIONS OF THE DRAWINGS

Embodiments are described with reference to the following figures, in which.

DETAILED DESCRIPTION OF THE EMBODIMENTS

Figure 1:
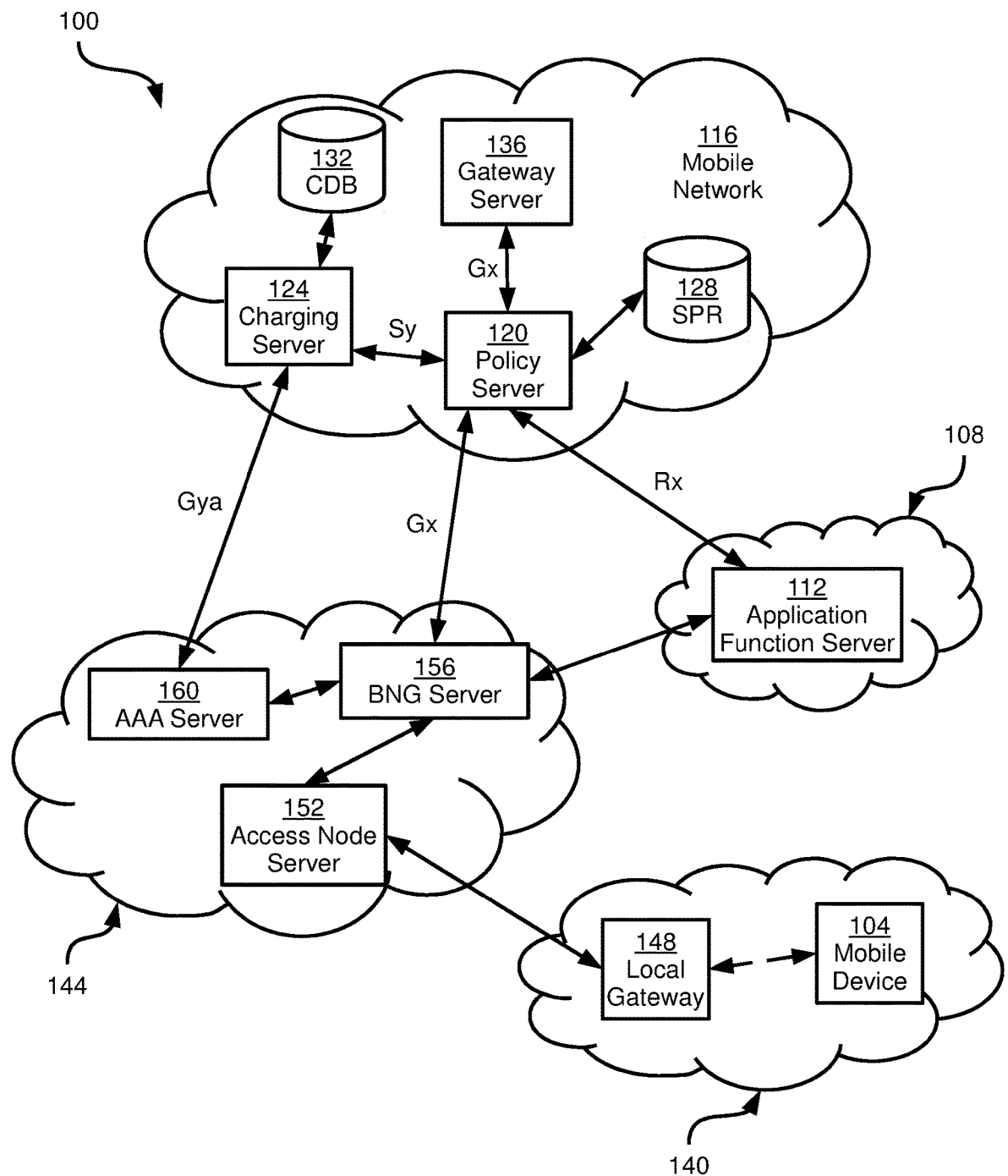
FIG. 1 depicts a communications system, according to a non-limiting embodiment.

FIG. 1 depicts a communications system 100. System 100 includes a communication device 104, which can be any of a variety of computing devices, and thus has hardware elements including a processing unit, one or both of volatile and non-volatile memory, network interfaces, input and output devices (e.g. displays, speakers, microphones, touch screens and the like). The processing unit of communication device 104 executes programming instructions stored in memory for carrying out various functions, including the initiation of data communications over certain networks.

In the embodiments discussed herein, communication device 104 is a cell phone or smart phone, able to connect to a variety of networks. In other embodiments, however, communication device 104 can include any other suitable computing device, such as a tablet computer, a desktop computer or the like. Thus, communication device 104 includes the necessary network interface hardware (such as radio assemblies and controllers), and stored programming instructions, to communicate with such networks.

System 100 also includes a plurality of networks. In particular, system 100 includes a multimedia network 108, which in the present embodiment is an IP Multimedia Subsystem (IMS) network, but in other embodiments can be implemented with any of a variety of suitable architectures. Network 108 contains various network elements that interoperate to provide communication device 104 with various Internet Protocol (IP)-based services, such as voice over Internet Protocol (VoIP) services that allow communication device 104 to establish communication sessions with other computing devices (e.g. a voice or video call with another mobile device, not shown). Other examples of services provided to communication device 104 by network 108 include instant messaging services (e.g. WhatsApp). Among those network elements is an application function (AF) server 112. In embodiments in which network 108 is an IMS network, AF server 112 is a proxy call session control server (P-CSCF). Various other conventional implementations of network 108, AF server 112, and other network elements within network 108 (such as a media gateway controller, and the like) will now be apparent to those skilled in the art.

In general, communication device 104 does not have entirely unrestricted access to network 108 and the services provided by network 108. Instead, various subscriber data associated with communication device 104 is stored. The subscriber data includes parameters defining, for example, the volume of data that communication device 104 is permitted to exchange with network 108; the cost (e.g. the cost per unit of data) to communication device 104 to exchange such data with network 108; an account balance associated with mobile device 104; and the like. Other examples of subscriber data include a Quality of Service (QoS) class identifier (QCI).

In the present example, the above-mentioned subscriber data is stored in a mobile network 116. which in the present embodiment can be an Evolved Packet Core (EPC) network, structured according to the Long Term Evolution (LTE) standard set by the 3rd Generation Partnership Project (3GPP). Mobile network 116 includes a policy server 120 and a charging server 124. Mobile network 116, when implemented as a core mobile network, can also include other network elements, such as a Mobility Management Entity, MME, and a Home Subscriber Server, HSS, which are implemented conventionally and not shown herein for simplicity.

As will now be apparent to those skilled in the art, policy server 120 may also be referred to as a policy and control rules function (PCRF), while charging server 124 may also be referred to as an open charging system (OCS). Certain features of policy server 120 and charging server 124 are specified by published 3GPP specifications. Other features of policy server 120 and charging server 124, however, are described herein that extend beyond the conventional functionality of PCRF and OCS elements detailed in the 3GPP specifications.

Policy server 120 and charging server 124 store the above-mentioned subscriber data. In particular, policy server 120 can maintain a plurality of subscriber records each corresponding to a different communication device (more specifically, each subscriber record corresponds to an operator of a mobile device, but in the present discussion the relationship between operator and device will be assumed to be fixed). The subscriber records are stored in a database, such as a conventional subscriber profile repository (SPR) 128. An example of SPR 128 is shown below in Table 1:

TABLE 1

Example SPR 128

| Subscriber ID | Services | Bandwidth | Data Cap |
|---|---|---|---|
| 104@mvno.com | VoIP | 5 Mpbs | 50 MB |
| ... | ... | ... | ... |

As seen above, SPR 128 contains a subscriber record corresponding to communication device 104. The record includes a subscriber identifier, a list of services to which communication device 104 is permitted access, a quality of service parameter (such as a bandwidth parameter defining the maximum bandwidth available to mobile device 104), and a data volume parameter (such as a maximum volume of data traffic that mobile device 104 is permitted to send or receive in a given time period, such as a month). SPR 128 can include other records for other communication devices. The contents of the above record is provided for illustrative purposes only; each subscriber record in SPR 128 can include additional fields in addition to, or instead of, those illustrated above. Further, the data stored in the fields of Table 1 need not be presented in the form illustrated herein. For example, the subscriber identifier need not be as shown above, but can be replaced by (or supplemented by) another identifier, such as an international mobile subscriber identifier (IMSI) or international mobile station equipment identity (IMEI). That is, although device 104 can have an IMSI or IMEI (as conventional communication devices in mobile networks generally do), it is not necessary for device 104 to have such identifiers in system 100.

Charging server 124, meanwhile, can maintain a plurality of charging records, each corresponding to a different communication device. The charging records are stored in a database, such as a charging database 132 shown in FIG. 1. In other embodiments, databases 128 and 132 can be combined in a single database which can be connected to either one of, or both of, policy server 120 and charging server 124. An example charging database 132 is shown below in Table 2.

TABLE 2

Example CDB 132

| Subscriber ID | Account balance | Session usage counter | Monthly usage counter |
|---|---|---|---|
| 104@mvno.com | $13.10 | 0 MB | 14 MB |
| ... | ... | ... | ... |

As noted above in connection with SPR 128, the contents of CDB 132 can be varied, and the example shown in Table 2 is provided simply for the purpose of illustration. In the above example, each record of CDB 132 includes a subscriber identifier, an account balance, a session usage counter representing the volume of data exchanged between communication device 104 and a destination network element (such as AF server 112) in a current communications session, and a total usage counter for a period of time (e.g. across multiple sessions), such as a one-month period. As will now be apparent to those skilled in the art, charging server 124 may also store, in CDB 132 or elsewhere, rating data specifying the monetary cost (to be applied to the account balance in CDB 132) of volumes of data for various services.

Policy server 120 and charging server 124 act to control access to network elements such as AF server 112 by communication device 104, and to update the account balance associated with communication device 104 in CDB 132 (e.g. by decrementing the account balance) responsive to such access. It is necessary, however, as will be apparent to those skilled in the art, for policy server 120 and charging server 124 to be notified that communication device 104 wishes to access (or has accessed) network elements such as AF server 112 in order to implement the above-mentioned control.

In some instances (such as a typical 3GPP scenario), communication device 104 connects to AF server 112 via a gateway server 136 in mobile network 116, when mobile network 116 is implemented as a core mobile network. Gateway server 136 can be implemented as a known Packet Data Network Gateway (PDN Gateway or P-GW), and can therefore be connected to policy server 120 (e.g. via the known Gx interface). Gateway server 136 can also be connected to one or both of charging server 124 and AF server 112. When communication device 104 connects to gateway server 136, communication device 104 provides gateway server 136 with a subscriber identifier (in the typical 3GPP scenario, this is generally an IMSI or IMEI), which gateway server 136 in turn provides to policy server 120. Further, when communication device 104 requests access to a service such as a VoIP service from AF server 112, AF server 112 can be configured to provide data to policy server 120 (e.g. using the known Rx protocol), including the above-mentioned subscriber identifier (in the typical 3GPP scenario, the same IMSI or IMEI, which is known to both networks 108 and 116). Policy server 120 can process the data received from gateway server 136 and AF server 112, as well as data received from charging server 124 (e.g. via the known Sy protocol), to generate and deploy rules to gateway server 136 to control access to AF server 112 by communication device 104.

In other instances, however, communication device 104 connects to AF server 112 without contacting gateway server 136 in mobile network 108. For example, communication device 104 can connect to AF server 112 via a local area network (LAN) 140 and a wide area network (WAN) 144. In the present embodiment, LAN 140 is a wireless LAN (WLAN), such as a WiFi network, and includes a local gateway server 148 that implements the functions of both a routing gateway (i.e. a router) and a wireless access point. In other embodiments, those two functions can be implemented in distinct hardware devices.

In other words, at least a portion of data traffic exchanged by communication device 104 and multimedia network 108 can bypass mobile network 116. Thus, in such embodiments network 116 need not include gateway server 136. This arrangement will be recognized by those skilled in the art as Non-Seamless WLAN Offload (NSWO), certain specifications for which are laid out in 3GPP Technical Specifications 23.402 (version 12.5.0) and 23.203 (version 13.2.0), as well as the Broadband Forum specification TR-300, Issue 1.

WAN 144, in the present embodiment, is a fixed broadband network structured according to the specifications set forth by the Broadband Forum (BBF), and may therefore be referred to as a BBF network. Other structural arrangements for network 144 can also be implemented, however.

LAN 140 connects to WAN 144 via an access node server 152, such as a conventional digital subscriber line access multiplexer (DSLAM). Through access node server 152, communications from mobile device 104 are routed to a broadband network gateway (BNG) server 156, which may also be referred to as a broadband remote access server (BRAS). BNG server 156, in turn, can route traffic from mobile device 104 to AF server 132, without such traffic entering mobile network 108. Although not depicted in FIG. 1, other network elements (such as Internet routers) may intermediate communications between BNG server 156 and AF server 132.

Network 144 also includes an authentication, authorization and accounting (AAA) server 160. AAA server 160, as will now be apparent to those skilled in the art, stores subscriber records for devices authorized to connect to network 144, and can therefore determine whether or not a device requesting access to network 144 is permitted such access. Thus, when connecting to network 144, communication device 104 can provide a subscriber identifier previously assigned to communication device 104, which AAA server 160 receives from BNG server 156 and compares to the above-mentioned subscriber records to determine whether to permit access to communication device 104.

When communication device 104 is granted access to network 144 (e.g. because device 104 has a subscriber identifier matching one of those stored at AAA server 160), as set out in the BBF specifications (e.g. TR-300, mentioned above), BNG server 156 is configured to transmit data identifying communication device 104 to policy server 120, for example using the Gx protocol. Similarly, AAA server 160 is configured to transmit data identifying communication device 104 to charging server 124, for example using the Gya protocol. Further, when mobile device 104 contacts AF server 112 to begin a VoIP session (or any other service provided by AF server 112), AF server 112 is configured to transmit data as mentioned earlier to policy server 120. Still further, during communications between communication device 104 and AF server 112 (routed through network 144), BNG server 156 and AAA server 160 are configured to send data identifying mobile device 104 to policy server 120 and charging server 124, respectively. Such data can also include indications of the volume of data exchanged by mobile device 104 and AF server 112.

Therefore, the elements of networks 108 and 144 are configured to enable mobile network 116 to perform the previously mentioned control and account balance update functions even in situations in which some or all of the data traffic between mobile device 104 and AF server 112 does not traverse network 116. However, in the present embodiment the subscriber identifier employed by communication device 104 to access network 144 does not match the subscriber identifier employed by communication device 104 to access network 116. For example, networks 144 and 116 may be operated by different entities (e.g. networks 116 and 108 may be operated by a mobile service provider such as a mobile virtual network operator or MVNO, while network 144 may be operated by a second entity, such as an Internet Service Provider or ISP). In such implementations, conventional PCRF and OCS elements may fail to perform the control and account balance update functions for NSWO communications sessions between communication device 104 and AF server 112, as they may not recognize the subscriber identifiers provided to them by the elements of network 144. Policy server 120 and charging server 124, as will be discussed herein, are configured to perform certain additional actions extending beyond those performed by conventional mobile network elements in order to perform control and account balance update functions in such situations.

Before discussing the actions performed by policy server 120 and charging server 124 in further detail, certain internal hardware components of policy server 120 and charging server 124 will be discussed, with reference to FIG. 2.

Figure 2:
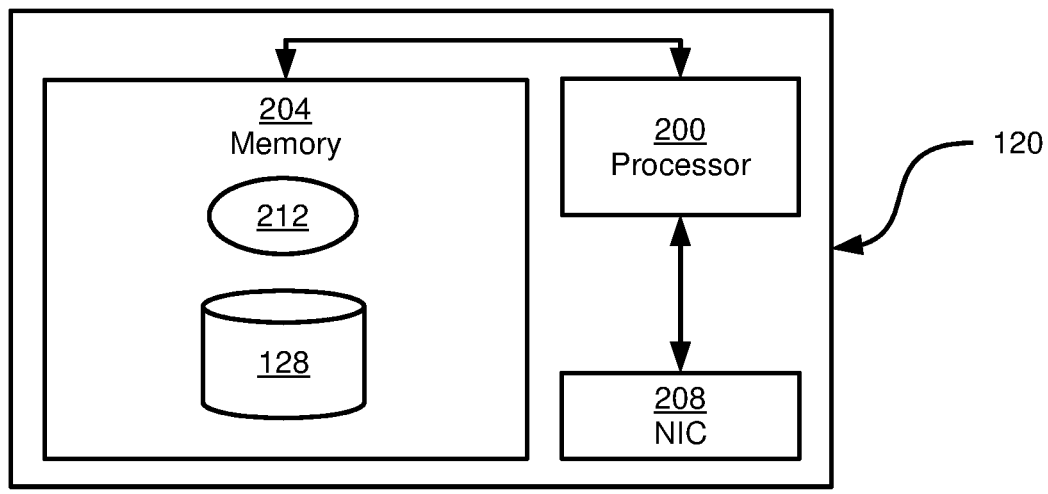
FIG. 2 depicts certain internal components of the policy and charging servers of FIG. 1, according to a non-limiting embodiment.
Figure 2:
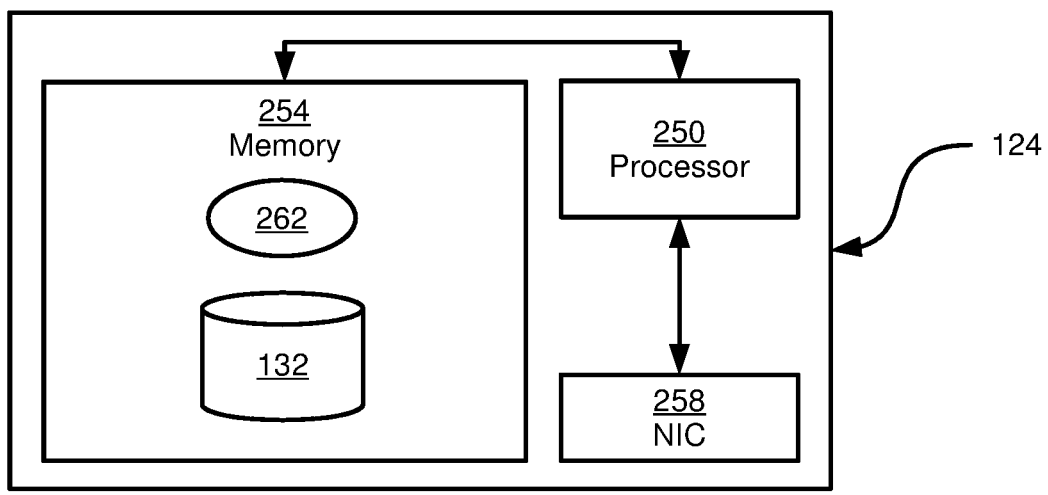

Turning to FIG. 2, policy server 120 and charging server 124 include respective central processing units (CPUs), or processors, 200 and 250. Processors 200 and 250 are interconnected with respective memories 204 and 254, as well as respective network interfaces 208 and 258. Processors 200, 250 and memories 204, 254 are generally comprised of one or more integrated circuits (ICs), and can have a variety of structures, as will now occur to those skilled in the art (for example, more than one CPU can be provided). Memories 204 and 254 can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory.

Network interfaces 208, 258 can be network interface controllers (NIC) that allow policy server 120 and charging server 124 to connect to each other and other computing devices (e.g. BNG server 156, AAA server 160). Policy server 120 and charging server 124 can also each include input and output devices, such as keyboards, mice, displays, and the like (not shown).

Memories 204, 254 store a plurality of computer-readable programming instructions, executable by processors 200 and 250, respectively, in the form of various applications. As will be understood by those skilled in the art, processors 200 and 250 can execute the instructions of or more such applications in order to perform various actions defined within the instructions. In the description below, processors 200, 250 or more generally policy server 120 or charging server 124 are said to be "configured to" perform certain functions. It will be understood that they are so configured via the execution of the instructions of the applications stored in memories 204, 250.

Among the applications stored in memory 204 is a policy application 212, which is executable by processor 200 to perform various actions described herein. Memory 204, in the present example, also stores SPR 128; in other embodiments, SPR 128 can be stored in the memory of a separate computing device (not shown) and data can be retrieved from SPR 128 by policy server 120 via network interface 208.

At charging server 124, meanwhile, a charging application 262 is stored in memory 254, and is executable by processor 250 to perform various actions described herein. Memory 254 also stores CDB 132 in the present example, although in other embodiments CDB 132 can be stored in the memory of a separate computing device (not shown) and data can be retrieved from CDB 132 by charging server 124 via network interface 258.

Figure 3:
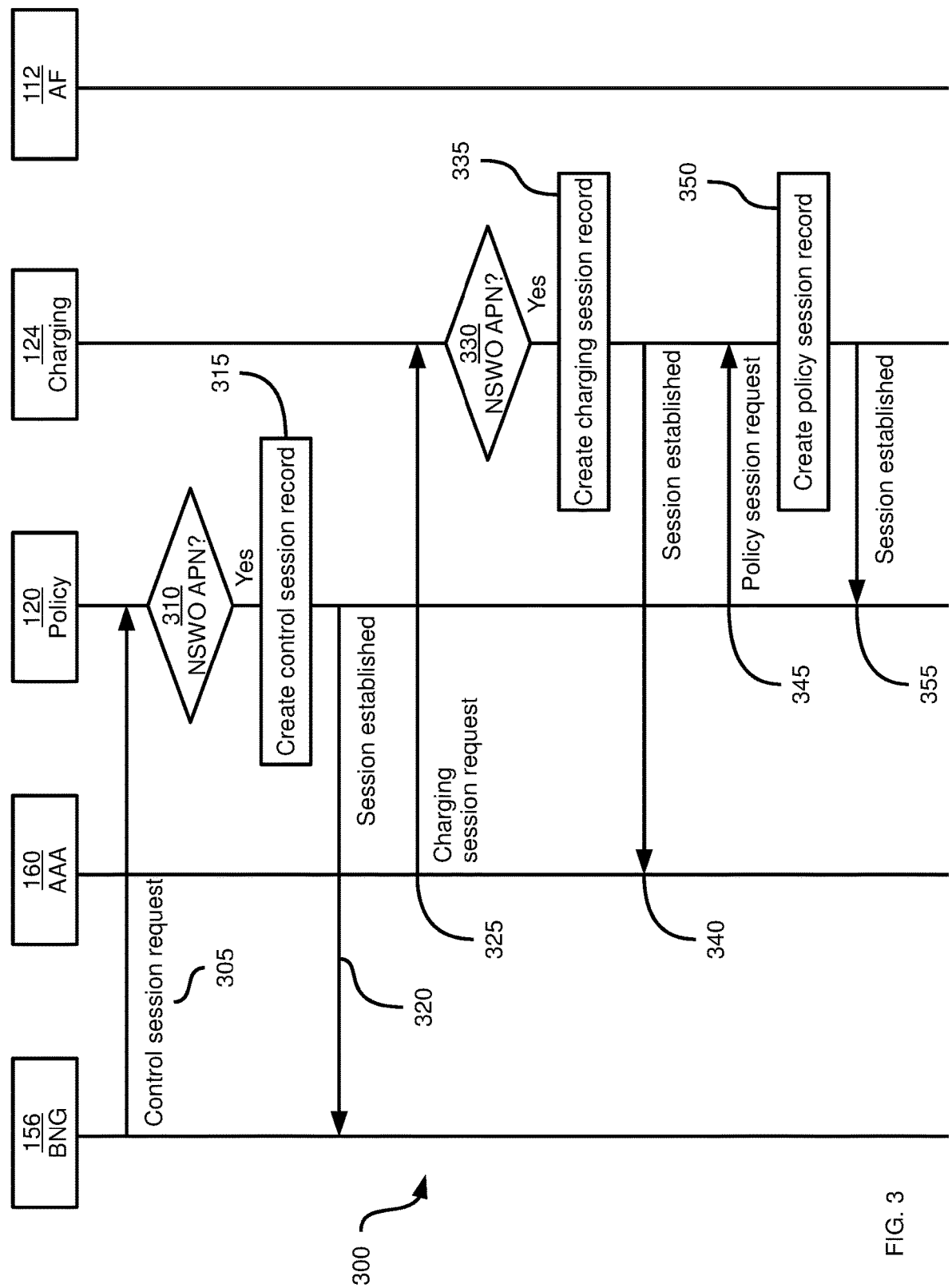
FIG. 3 depicts a method of authorizing and authenticating offloaded data sessions, according to a non-limiting embodiment.

Turning now to FIG. 3, a method 300 of authorizing and authenticating offloaded data sessions within mobile network 116 is illustrated. Method 300 will be described in conjunction with its performance on system 100, although it will be apparent to those skilled in the art that method 300 may also be performed on suitable variants of system 100. More specifically, various blocks of method 300 are performed by the network elements shown in FIG. 3, via the execution of respective instructions by the processors of such network elements.

Prior to the performance of block 305 of method 300, it is assumed that mobile device 104 has connected to network 144 according to conventional processes. In an example of such processes, mobile device 104 transmits a request to BNG server 156 to connect to network 144. The request includes a first subscriber identifier assigned to mobile device 104 by the operator of network 144. In the present example, the first subscriber identifier is "104@home.com".

A wide variety of other identifiers can also be employed, as will be apparent to those skilled in the art.

Having received the first subscriber identifier, BNG server 156 transmits the first subscriber identifier to AAA server 160, and AAA server 160 verifies that the first subscriber identifier matches an authorized subscriber record maintained at AAA server 160. Mobile device 104 is then permitted access to network 144. During the above process, mobile device 104 is also assigned a network address, such as an IP address, within network 144. The IP address may be assigned the network address by, for example, local gateway 148.

At block 305 of method 300, BNG server 156 is configured, in accordance with the BBF specifications, to transmit a control session request to policy server 120, for example in the form of an initial credit control request (CCR-I) message sent via the Gx protocol. The control session request contains the first subscriber identifier ("104@home.com"), the network address mentioned above, and an indication that the control session is for controlling offloaded data traffic—that is, traffic between mobile device 104 and other (as yet unidentified) network elements that bypasses network 116. An example of such an indication is a predefined access point name (APN) parameter indicating the use of NSWO, referred to herein as the NSWO-APN.

At block 310, policy server 120 is configured to receive the control session request and determine whether the request includes an indication that the control session is associated with offloaded data traffic. For example, policy server 120 can be configured to determine whether the request includes the NSWO-APN. When the determination is negative, policy server 120 is configured to proceed conventionally (e.g. by validating that the subscriber identifier matches a subscriber record in SPR 128). However, when the determination is affirmative, policy server 120 is configured to create and store, in memory 204, a control session record at block 315.

It will be noted that block 315 is performed without further validation of the subscriber identifier received with the request. That is, policy server 120 can perform block 315 without consulting SPR 128. A control session record is therefore created at block 315 despite the fact that the subscriber identifier received at block 305, "104@home.com", does not match any subscriber identifier in SPR 128 (the identifier associated with communication device 104 in SPR 128 is "104@mvno.com").

The control session record created and stored at block 315 includes the first subscriber identifier and the network address received from BNG server 156. The control session record also includes a control session identifier (either generated by policy server 120 or received from BNG server 156). The control session record can also include QoS parameters, such as bandwidth and data cap allocations to be enforced by BNG server 156 for mobile device 104 (although not necessarily within network 144—such parameters relate instead to traffic travelling between network 144 and network 108 on behalf of mobile device 104). The QoS parameters can be default parameters stored in memory 204 and employed by policy server 120 for any new control sessions.

At block 320, policy server 120 is configured to transmit a message to BNG server 156 confirming that the control session has been successfully established. The confirmation message can be, for example, in the form of an initial credit control answer (CCA-I) message, and includes the control session identifier. The confirmation message can also include other data, such as the first subscriber identifier and the above-mentioned QoS parameters.

At block 325, AAA server 160 is configured to transmit a charging session request to charging server 124. Similarly to the control session request mentioned above, the charging session request can take the form of CCR-I message sent via the Gya protocol. The charging session request contains the first subscriber identifier ("104@home.com"), the network address mentioned above, and an indication that the control session is for controlling offloaded data traffic, such as the NSWO-APN.

At block 330, charging server 124 is configured to receive the charging session request and determine whether the request includes an indication that the charging session is associated with offloaded data traffic. For example, charging server 124 can be configured to determine whether the request includes the NSWO-APN. When the determination is negative, charging server 124 is configured to proceed conventionally (e.g. by validating that the subscriber identifier matches a subscriber record in CDB 132). However, when the determination is affirmative, charging server 124 is configured to create and store, in memory 254, a charging session record at block 335.

As noted above in connection with block 315, block 335 is performed without further validation of the subscriber identifier received with the request from AAA server 160.

That is, charging server 124 can perform block 335 without consulting CDB 132. A charging session record is therefore created at block 335 despite the fact that the subscriber identifier in the request sent at block 325, "104@home.com", does not match any subscriber identifier in CDB 132 (the identifier associated with mobile device 104 in CDB 132 is "104@mvno.com").

The charging session record created and stored at block 335 includes the first subscriber identifier and the network address received from AAA server 160. The charging session record also includes a charging session identifier (either generated by charging server 124 or received from AAA server 160). Having generated the charging session record, at block 340 charging server 124 returns a confirmation message, such as a CCA-I message using the Gya protocol, to AAA server 160 confirming that the charging session has been successfully established and including the above-mentioned charging session identifier. The confirmation message can also include the first subscriber identifier.

At block 345, policy server 120 is further configured to send a policy session request, such as a spending limit request (SLR) using the Sy protocol, to charging server 124. The policy session request is to establish a communications session between policy server 120 and charging server 124 to allow policy server 120 to obtain data (such as the counters shown in Table 2) from charging server 124 for use in controlling future communications sessions between mobile device 104 and other network elements (such as AF 112). The policy session request includes at least the first subscriber identifier.

At block 350, charging server 124 is configured to create and store (in memory 354) a policy session record including the first subscriber identifier ("104@home.com"), the network address, and a policy session identifier (either created by charging server 124 or received from policy server 120 with the request sent at block 345). As noted earlier in connection with blocks 315 and 335, it is contemplated that the policy session record is created at block 350 without any validation of the first subscriber identifier. The policy session record can include At block 355, charging server 124 is configured to confirm the establishment of the policy session to policy server 120. Below, in Tables 3 and 4, are examples of the session records stored at policy server 120 and charging server 124 following the performance of method 300.

TABLE 3

Session Record at Policy Server 120
Control Session Record

| Subscriber ID | Network Address | Session ID |
| --- | --- | --- |
| 104@home.com | 123.456 | S104-156 |

TABLE 4

Session Records at Charging Server 124

| Charging Session Record | | | Policy Session Record | | |
| --- | --- | --- | --- | --- | --- |
| Subscriber ID | Network Address | Session ID | Subscriber ID | Network Address | Session ID |
| 104@home.com | 123.456 | S104-160 | 104@home.com | 123.456 | S104-120 |

Figure 4:
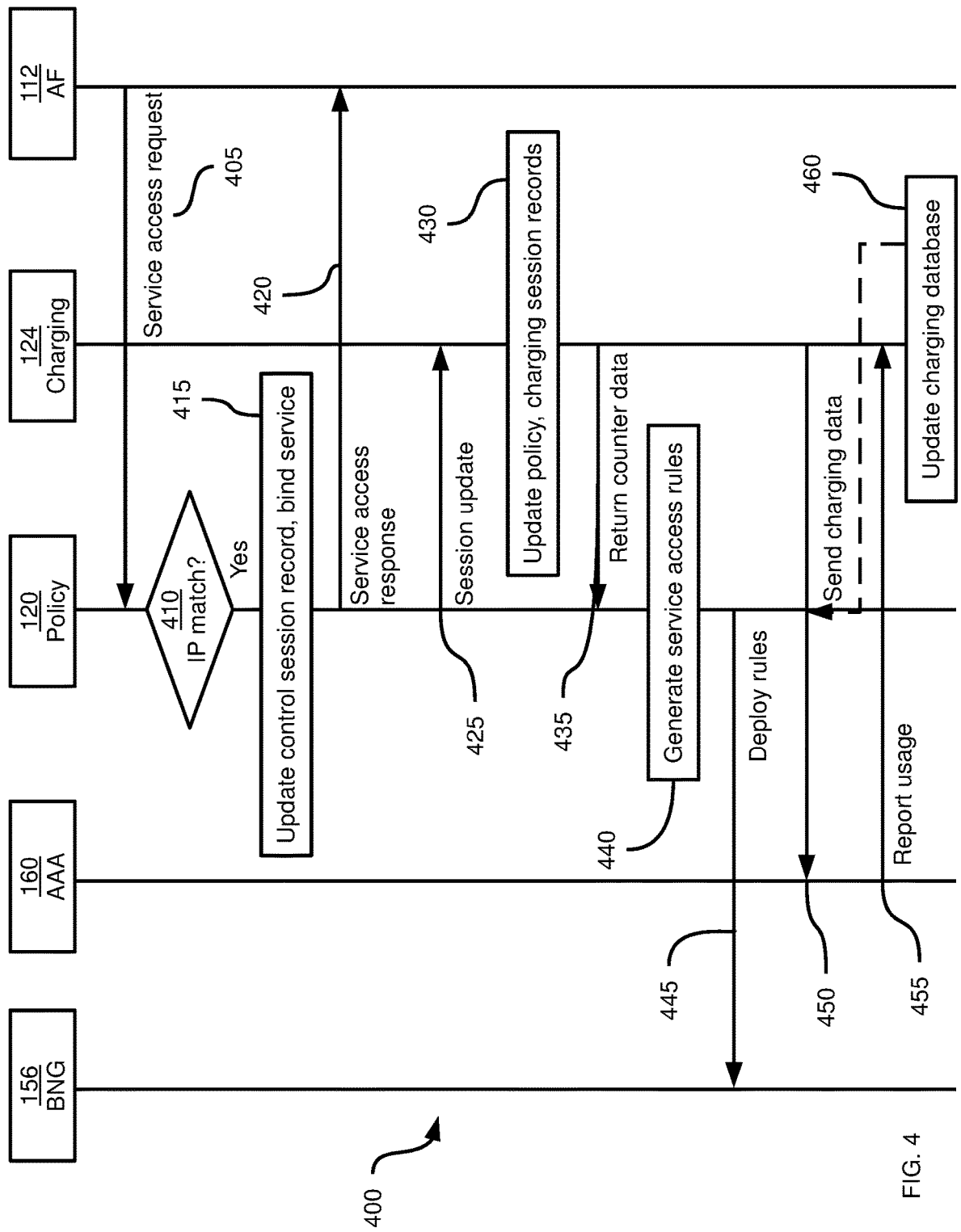
FIG. 4 depicts a further method of authorizing and authenticating offloaded data sessions, according to a non-limiting embodiment.

Referring now to FIG. 4, a method 400 of authorizing and authenticating offloaded data sessions within mobile network 116 is illustrated. Method 400 is a continuation of method 300, and therefore is also described below in conjunction with its performance in system 100, following the performance of method 300 as discussed above.

Prior to the performance of block 405, communication device 104 is assumed to send a request to AF server 112 (via network 144) to initiate a service provided by AF server 112, such as a VoIP service. Of particular note, the request from communication device 104 to AF server 112 includes a second subscriber identifier instead of the above-mentioned first subscriber identifier. The second subscriber identifier is an identifier assigned to communication device by the operator of networks 108 and 116, such as "104@mvno.com". As will now be apparent to those skilled in the art, mobile device 104 can be configured to employ the second subscriber identifier when attempting to access services provided by AF server 112.

At block 405, AF server 112 is configured to transmit a service access request to policy server 120. The service access request, in the present embodiment, takes the form of an Authorization Authentication Request (AAR) message sent using the Rx protocol. Other suitable message formats will also occur to those skilled in the art, however. The service access request includes the second subscriber identifier, and the network address of mobile device 104 (e.g. an IP address, as mentioned earlier). The request also generally includes an identification of the service requested by mobile device 104.

At block 410, policy server 120 is configured to determine whether the network address received with the service access request matches the network addresses of any control session records in memory 204. When the determination is negative, policy server 120 can be configured to deny the service access request. When the determination is affirmative, however, policy server 120 is configured to proceed to block 415.

At block 415, policy server 120 is configured to retrieve the matching control session record (shown above in Table 3) and update the subscriber identifier field therein, to append the second subscriber identifier to the first subscriber identifier. Policy server 120 is also configured to bind the request from AF server 112 with the control session record created at block 315. For example, policy server 120 can be configured to create a session record for communications between policy server 120 and AF server 112. Binding the AF server 112's request with the control session record can include storing a session identifier of the AF session (e.g. the Rx session) in the control session record, as shown below in Table 5.

TABLE 5

Updated Session Record at Policy Server 120
Control Session Record

| Subscriber IDs | Network Address | Session ID | AF Session ID |
|---|---|---|---|
| 104@home.com 104@mvno.com | 123.456 | S104-156 | S104-112 |

Following the performance of block 415, at block 420 policy server 120 is configured to confirm the receipt of the service access request, for example by transmitting an Authorization Authentication Answer (AAA) message to AF server 112 using the Rx protocol. The message sent at block 420 to AF server 112 can contain any suitable parameters permitting AF server 112 to begin providing the requested service to communication device 104.

At block 425, policy server 120 is configured to transmit a session update message to charging server 124, for example in the form of an SLR message using the Sy protocol. The session update message contains the session identifier identifying the policy session established at blocks 345-355 of method 300. The session update message also contains the second subscription identifier.

In response to the session update message, at block 430 charging server 124 is configured to update both the charging session record (generated at block 335) and the policy session record (generated at block 350). Specifically, charging server 124 is configured to update the charging session record to include both the first subscriber identifier and the second subscriber identifier. Further, charging server 124 is configured to update the policy session record to replace the first subscriber identifier with the second subscriber identifier. Thus, in the present example embodiment, following the performance of block 430, the session records stored in memory 254 of charging server 124 are as shown in Table 6.

TABLE 6

Updated Session Records at Charging Server 124

| Charging Session Record | | | Policy Session Record | | |
|---|---|---|---|---|---|
| Subscriber IDs | Network Address | Session ID | Subscriber ID | Network Address | Session ID |
| 104@home.com 104@mvno.com | 123.456 | S104-160 | 104@mvno.com | 123.456 | S104-120 |

As will now be apparent to those skilled in the art, the nature of the session record updates performed by policy server 120 and charging server 124, respectively, at blocks 415 and 430, are based on the uses of those session records. The control session record defines a communications session between policy server 120 and BNG server 156, over which policy server 120 deploys rules for the use of the VoIP service by mobile device 104. BNG server 156, being a component of network 144, is configured to identify mobile device 104 by the first subscriber identifier. Policy server 120, meanwhile, being a component of network 116, is configured to identify mobile device by the second subscriber identifier (as evidenced by Table 1, showing the contents of SPR 128). The update of the control session record to contain both subscriber identifiers therefore permits policy server 120 to communicate with BNG server 156 concerning mobile device 104, while remaining able to retrieve appropriate data from SPR 128, and without requiring modifications to BNG server 156 to accommodate use of a subscriber identifier (specifically, the second subscriber identifier "104@mvno.com") not previously employed within network 144.

The charging session record maintained at charging server 124 defines a communications session between charging server 124—which employs the second subscriber identifier to identify mobile device 104—and AAA server 160, which employs the first subscriber identifier to identify mobile device 104. Therefore, the insertion of both subscriber identifiers in the charging session record at block 430 permits charging server 124 to receive data from AAA server 160 (as will be discussed below), and update the appropriate record in CDB 132, without requiring modifications to AAA server 160 that would allow AAA server 160 to make use of the second subscriber identifier.

The policy session record, meanwhile, defines a communications session between policy server 120 and charging server 124, over which policy server 120 can request and retrieve data such as the counters stored in CDB 132. Because both policy server 120 and charging server 124 are elements of network 116, both use the second subscriber identifier to identify communication device 104 (as evidenced by Tables 1 and 2). Therefore, the first subscriber identifier can be discarded upon discovery of the corresponding second subscriber identifier. In other embodiments, however, the first subscriber identifier can be retained in the policy session record (and supplemented with the second subscriber identifier).

Having updated the session records in memory 254 at block 430, at block 435 charging server 124 is configured to retrieve the record of CDB 132 corresponding to the second subscriber identifier, and to transmit one or more counter values from the retrieved record to policy server 120. The values transmitted can be identified by policy server 120 in the session update request. In other embodiments, the values may have been identified in the original policy session request at block 345. In still other embodiments, charging server 124 can be configured to retrieve and send all available counters from CDB 132 for mobile device 104.

At block 440, policy server 120 is configured to generate rules for the communication session between mobile device 104 and AF server 112. As will be apparent to those skilled in the art, the generation of such rules is based on the counters received from charging server 124, as well as any data received from AF server 112 and the contents of the record of SPR 128 corresponding to mobile device 104. The generation of rules at policy server 120 is performed according to conventional processes.

At block 445, policy server 120 is configured to deploy the rules generated at block 440 to BNG server 156 via the communications session defined by the control session record. The deployment of rules, and the implementation and enforcement of those rules at BNG server 156, is performed conventionally.

At block 450, charging server 124 transmits a charging message, such as a Re-Authorization Request (RAR) using the Gya protocol, to AAA server 160 over the session defined by the charging session record. The charging message can include credit data, for example defining a monetary amount or a volume of data available to mobile device 104 during communications with AF server 112.

Following the deployment of rules at block 445 and the transmission of credit data at block 450, the communications session between mobile device 104 and AF server 112 proceeds. As set out in the 3GPP specifications (e.g. TS 23.203, section S.8.8.2) AAA server 160 is configured, during the communications session, to receive usage data from BNG server 156 reflecting the volume of data exchanged between mobile device 104 and AF server 112. AAA server 160 is further configured to transmit such usage data to charging server 124 at block 455 (e.g. via a Re-Authorization Answer, or RAA, message). At block 460, in response to receiving the usage data, charging server 124 is configured to update CDB 132 (more specifically, the record of CDB 132 corresponding to mobile device 104). The update can be, for example, decrementing the account balance in CDB 132 associated with mobile device 104 based on the volume of data exchanged by mobile device 104 and AF server 112. Charging server 124 can also, if necessary, return updated charging data (e.g. by allocating a further quota to mobile device 104) to AAA server by repeating block 450. This process can continue until the session between mobile device 104 and AF server 112 is terminated.

Certain advantages to the above systems and methods will now occur to those skilled in the art. For example, as a result of the above-described actions performed by policy server 120 and charging server 124, mobile device 104 can to access services provided by AF server 112 via networks 140 and 144, despite the fact that network 144 uses a different subscriber identifier than networks 108 and 116 to identify mobile device 104. Conventionally, such mismatching subscriber identifiers may prevent communication device 104 from accessing AF server 112 as described herein, since conventional policy and charging elements in network 116 generally ignore requests that do not contain recognized subscriber identifiers (that is, identifiers appearing in SPR 128 and CDB 132). Other advantages may also occur to those skilled in the art.

Variations to the above systems and methods are contemplated. For example, in some embodiments, certain blocks of methods 300 and 400 can be rearranged (e.g. the creation of a policy session record at blocks 345 to 355 can precede the creation of a charging session record at blocks 325 to 340 in some embodiments).

The scope of the claims should not be limited by the embodiments set forth in the above examples, but should be given the broadest interpretation consistent with the description as a whole.

I claim:

1. A method in a policy server of a mobile network for authorization and authentication of data traffic bypassing the mobile network, the method comprising:
   storing a plurality of subscriber records in a memory, each subscriber record containing one of a plurality of mobile subscriber identifiers corresponding to one of a plurality of communication devices;
   receiving, at a processor of the policy server, a control session request from a gateway server in a fixed broadband network, the control session request including a broadband subscriber identifier and a first network address;
   responsive to receiving the request, creating and storing a control session record including the broadband subscriber identifier and the first network address;
   receiving an access session request from an application server in a multimedia network, the access session request including one of the mobile subscriber identifiers and a second network address;
   determining whether the first network address matches the second network address; and
   when the determination is affirmative, updating the control session record to insert the mobile subscriber identifier.

2. The method of claim 1, wherein the updated control session record contains both the broadband subscriber identifier and the mobile subscriber identifier.

3. The method of claim 1, further comprising:
   prior to creating the control session record, determining whether the control session request includes an indication that the control session record is for controlling offloaded data traffic.

4. The method of claim 3, wherein the indication is a non-seamless WLAN offload access point name (NSWO-APN).

5. The method of claim 1, further comprising creating the control session record without validating the broadband subscriber identifier.

6. The method of claim 1, further comprising:
   after creating the control session record, sending a policy session request to a charging server in the mobile network, the policy session request including the broadband subscriber identifier and the first network address.

7. The method of claim 6, further comprising:
   responsive to determining that the first network address and the second network address match, transmitting a policy session update message to the charging server, the policy session update message including the mobile subscriber identifier.

8. The method of claim 7, further comprising:
   retrieving the one of the subscriber records containing the mobile subscriber identifier;

generating at least one control rule; and deploying the at least one control rule to the gateway server.

9. The method of claim 1, the first network address and the second network address each comprising an Internet Protocol (IP) address.

10. A policy server in a mobile network, for authorization and authentication of mobile data traffic bypassing the mobile network, comprising:
    a memory storing a plurality of subscriber records, each subscriber record containing one of a plurality of mobile subscriber identifiers corresponding to one of a plurality of communication devices;
    a network interface; and
    a processor interconnected with the memory and the network interface, the processor configured to perform the method of claim 1.

11. A method in a charging server of a mobile network for authorization and authentication of data traffic bypassing the mobile network, the method comprising:
    storing a plurality of charging records in a memory, each charging record containing one of a plurality of mobile subscriber identifiers corresponding to one of a plurality of mobile computing devices;
    receiving, at a processor of the charging server, a charging session request from an authentication, authorization and accounting (AAA) server in a fixed broadband network, the charging session request including a broadband subscriber identifier and a first network address;
    responsive to receiving the request, creating and storing a charging session record including the broadband subscriber identifier and the first network address;
    receiving a policy session request from a policy server in the mobile network, the policy session request including the broadband subscriber identifier;
    responsive to receiving the policy session request, creating and storing a policy session record containing the broadband subscriber identifier;
    receiving a policy session update message from a policy server in the mobile network, the policy session update message including one of the mobile subscriber identifiers and a second network address;
    responsive to receiving the policy session update message:
        updating the policy session record to insert the mobile subscriber identifier; and
        updating the charging session record to insert the mobile subscriber identifier.

12. The method of claim 11, wherein the updated charging session record contains both the broadband subscriber identifier and the mobile subscriber identifier.

13. The method of claim 11, wherein updating the policy session record comprises replacing the broadband subscriber identifier with the mobile subscriber identifier.

14. The method of claim 11, further comprising:
    prior to creating the charging session record, determining whether the charging session request includes an indication that the charging session record is for controlling offloaded data traffic.

15. The method of claim 14, wherein the indication is a non-seamless WLAN offload access point name (NSWO-APN).

16. The method of claim 11, further comprising creating the charging session record without validating the broadband subscriber identifier.

17. The method of claim 11, further comprising:
    receiving usage data from the AAA server, the usage data including the broadband subscriber identifier;
    retrieving the mobile subscriber identifier from the updated charging session record; and
    updating the one of the charging records containing the mobile subscriber identifier based on the usage data.

18. A charging server in a mobile network, for authorization and authentication of mobile data traffic bypassing the mobile network, comprising:
    a memory storing a plurality of charging records, each charging record containing one of a plurality of mobile subscriber identifiers corresponding to one of a plurality of mobile computing devices;
    a network interface; and
    a processor interconnected with the memory and the network interface, the processor configured to perform the method of claim 11.

* * * * *